(12) United States Patent
Takahashi et al.

(10) Patent No.: US 11,101,708 B2
(45) Date of Patent: Aug. 24, 2021

(54) ROTOR, MOTOR, AIR CONDITIONING APPARATUS, AND MANUFACTURING METHOD OF ROTOR

(71) Applicant: Mitsubishi Electric Corporation, Tokyo (JP)

(72) Inventors: Ryogo Takahashi, Tokyo (JP); Hiroki Aso, Tokyo (JP); Takanori Watanabe, Tokyo (JP); Takaya Shimokawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 121 days.

(21) Appl. No.: 16/462,584

(22) PCT Filed: Jan. 23, 2017

(86) PCT No.: PCT/JP2017/002066
§ 371 (c)(1),
(2) Date: May 21, 2019

(87) PCT Pub. No.: WO2018/134988
PCT Pub. Date: Jul. 26, 2018

(65) Prior Publication Data
US 2020/0067358 A1    Feb. 27, 2020

(51) Int. Cl.
*H02K 1/27* (2006.01)
*H02K 11/215* (2016.01)
(Continued)

(52) U.S. Cl.
CPC ......... *H02K 1/2766* (2013.01); *F24F 1/0018* (2013.01); *F24F 1/20* (2013.01);
(Continued)

(58) Field of Classification Search
CPC ........... H02K 1/30; H02K 15/12; H02K 21/16
(Continued)

(56) References Cited

U.S. PATENT DOCUMENTS

2005/0218861 A1* 10/2005 Kimura ............... H02K 19/103
318/712
2019/0089213 A1* 3/2019 Tsuruha .................. H02K 1/28

FOREIGN PATENT DOCUMENTS

JP         2004048827 A  *  4/2000
JP         2007221866 A  *  7/2000
(Continued)

OTHER PUBLICATIONS

International Search Report of the International Searching Authority dated Apr. 4, 2017 for the corresponding International application No. PCT/JP2017/002066 (and English translation).
(Continued)

*Primary Examiner* — Jose A Gonzales Quinones
(74) *Attorney, Agent, or Firm* — Posz Law Group, PLC

(57) ABSTRACT

A rotor has a shaft, a rotor core, and a position detection magnet. The rotor core is formed of electromagnetic steel sheets and has an annular shape about the shaft. The position detection magnet has an annular shape about the shaft and is attached to one side of the rotor core in an axial direction of the shaft. The position detection magnet has a first end surface facing the rotor core and a second end surface opposite to the first end surface. The position detection magnet has a tapered part at an inner periphery thereof, and the tapered part is inclined so that a distance from the shaft is maximum at the second end surface.

16 Claims, 13 Drawing Sheets

(51) Int. Cl.
*H02K 1/30* (2006.01)
*H02K 15/03* (2006.01)
*H02K 15/12* (2006.01)
*H02K 21/16* (2006.01)
*F24F 1/0018* (2019.01)
*F24F 1/20* (2011.01)
*F24F 1/32* (2011.01)

(52) U.S. Cl.
CPC .............. *F24F 1/32* (2013.01); *H02K 1/30* (2013.01); *H02K 11/215* (2016.01); *H02K 15/03* (2013.01); *H02K 15/12* (2013.01); *H02K 21/16* (2013.01); *H02K 2213/03* (2013.01)

(58) Field of Classification Search
USPC .......................................... 310/68 B, 156.05
See application file for complete search history.

(56) References Cited

FOREIGN PATENT DOCUMENTS

| | | | |
|---|---|---|---|
| JP | 2009284658 A | * | 9/2000 |
| JP | 2003-111324 A | | 4/2003 |
| JP | 2004-048827 A | | 2/2004 |
| JP | 2005-102390 A | | 4/2005 |
| JP | 2006-314165 A | | 11/2006 |
| JP | 2008-206354 A | | 9/2008 |
| JP | 2009-194944 A | | 8/2009 |
| JP | 2009-284658 A | | 12/2009 |
| JP | 2016-119806 A | | 6/2016 |
| JP | 2016-174472 A | | 9/2016 |
| WO | WO-2017081822 A1 * | 5/2017 | ............ H02K 1/276 |

OTHER PUBLICATIONS

Office Action dated Sep. 2, 2020 issued in corresponding CN patent application No. 201780078928.3 (and English translation).
Office Action dated Oct. 1, 2019 issued in corresponding JP patent application No. 2018-562842 (and English translation).

* cited by examiner

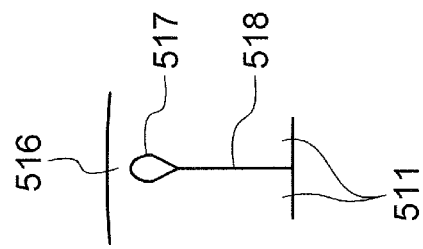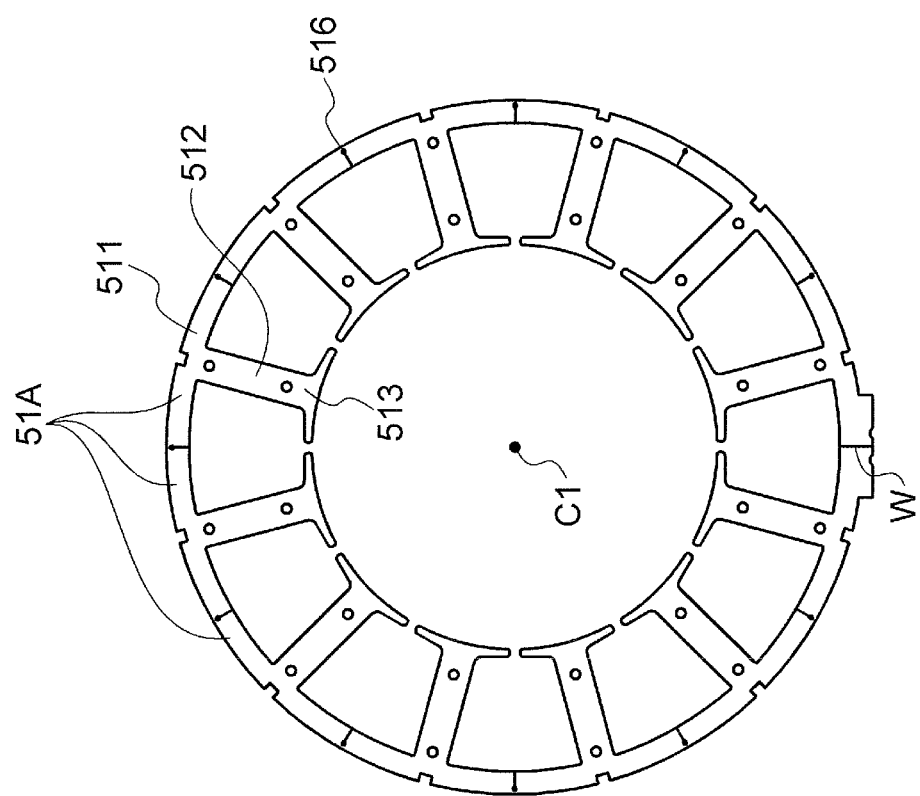

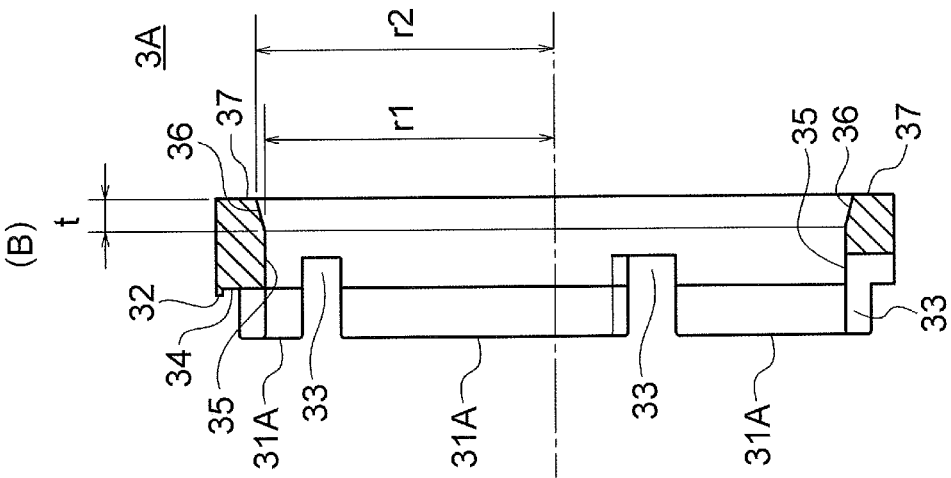
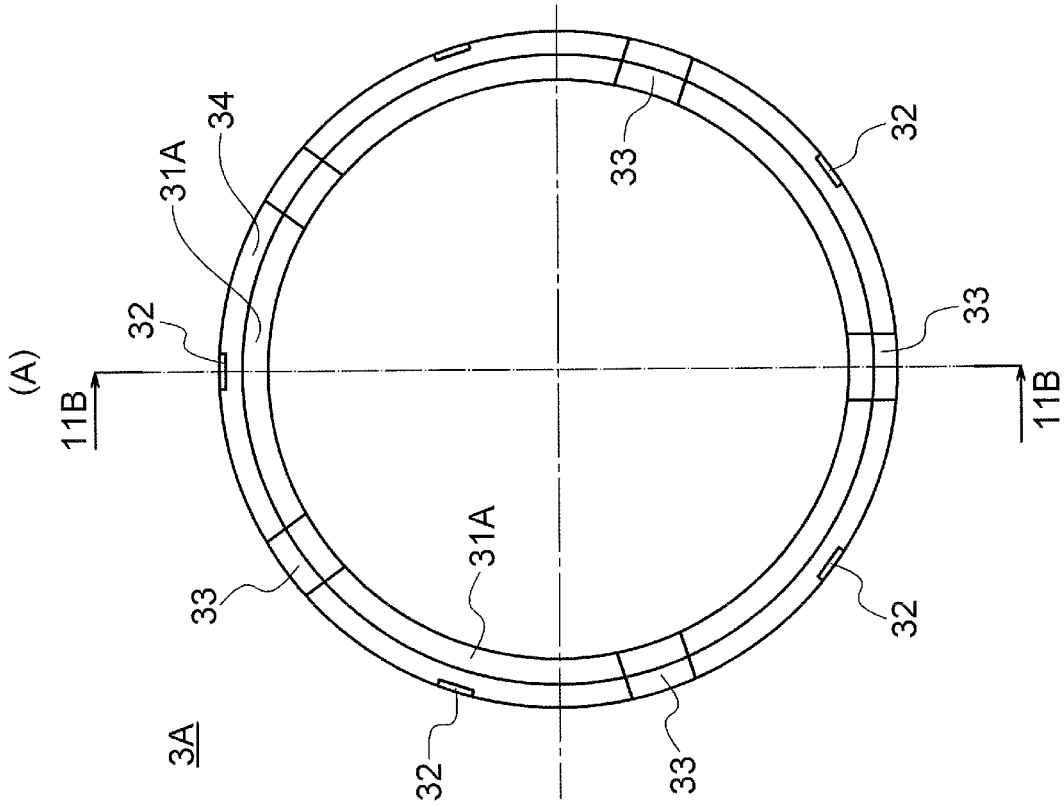

ROTOR, MOTOR, AIR CONDITIONING APPARATUS, AND MANUFACTURING METHOD OF ROTOR

CROSS REFERENCE TO RELATED APPLICATION

This application is a U.S. national stage application of International Patent Application No. PCT/JP2017/002066 filed on Jan. 23, 2017, the disclosure of which is incorporated herein by reference.

TECHNICAL FIELD

The present invention relates to a rotor, a motor, an air conditioning apparatus, and a manufacturing method of the rotor.

BACKGROUND ART

As a rotor of a motor, a rotor having an annular resin magnet is known. In the rotor of this kind, resin ribs are radially formed between the resin magnet and a shaft (rotation shaft).

During manufacturing of the rotor, a previously molded resin magnet is placed in a molding mold together with a shaft, and a resin is injected into the molding mold so that ribs are formed. In the molding mold, the resin magnet and the shaft are held in a state where they are separated from each other in a radial direction, and thus it is necessary to align center axes of the resin magnet and the shaft with each other. Thus, a tapered surface previously formed on an inner peripheral part of the resin magnet is brought into contact with a contact surface of the molding mold so that the center axes of the resin magnet and the shaft are aligned with each other (see, for example, Patent Reference 1).

On the other hand, a magnet-embedded rotor in which a magnet is embedded in the rotor is also known. In the magnet-embedded rotor, a magnet insertion hole is formed in a rotor core formed of a stacked body of electromagnetic steel sheets, and a magnet is mounted in the magnet insertion hole.

PATENT REFERENCE

Patent Reference 1: Japanese Patent Application Publication No. 2005-102390 (see FIGS. 1 and 5)

In the magnet-embedded rotor, it is conceivable to form resin ribs between the rotor core and the shaft in order to suppress leakage of rotor magnetic fluxes to the shaft.

However, it is difficult to form a tapered surface on an inner peripheral part of the rotor core formed of the stacked body of electromagnetic steel sheets, because formation of the tapered surface may cause steps between the electromagnetic steel sheets. Thus, enhancement of coaxiality between the rotor core and the shaft is an issue.

SUMMARY

The present invention is made to solve the issue, and an object of the present invention is to provide a rotor capable of enhancing coaxiality between a rotor core and a shaft.

A rotor according to the present invention includes a shaft, a rotor core formed of electromagnetic steel sheets and having an annular shape about the shaft, and a position detection magnet having an annular shape about the shaft and attached to one side of the rotor core in an axial direction of the shaft. The position detection magnet has a first end surface facing the rotor core and a second end surface opposite to the first end surface. The position detection magnet has a tapered part at an inner periphery thereof, the tapered part being inclined so that a distance from the shaft is maximum at the second end surface.

According to the present invention, in a manufacturing process of the rotor, coaxiality between the shaft and the position detection magnet can be enhanced by bringing the tapered part of the position detection magnet into contact with, for example, a contact surface of a molding mold. Accordingly, coaxiality between the shaft and the rotor core attached to the position detection magnet can also be enhanced. As a result, performance of the rotor and a motor having the rotor can be enhanced.

BRIEF DESCRIPTION OF THE DRAWINGS

FIG. 3(A) is a view illustrating a stator core in the first embodiment, and FIG. 3(B) is an enlarged view illustrating a part of the stator core.

FIG. 11(A) and FIG. 11(B) are a plan view and a sectional view illustrating a sensor magnet in a variation of the first embodiment.

DETAILED DESCRIPTION

Embodiments of the present invention will be described hereinafter in detail with reference to the drawings. These embodiments are not intended to limit the invention.

First Embodiment

Configuration of Motor 1

Figure 1:
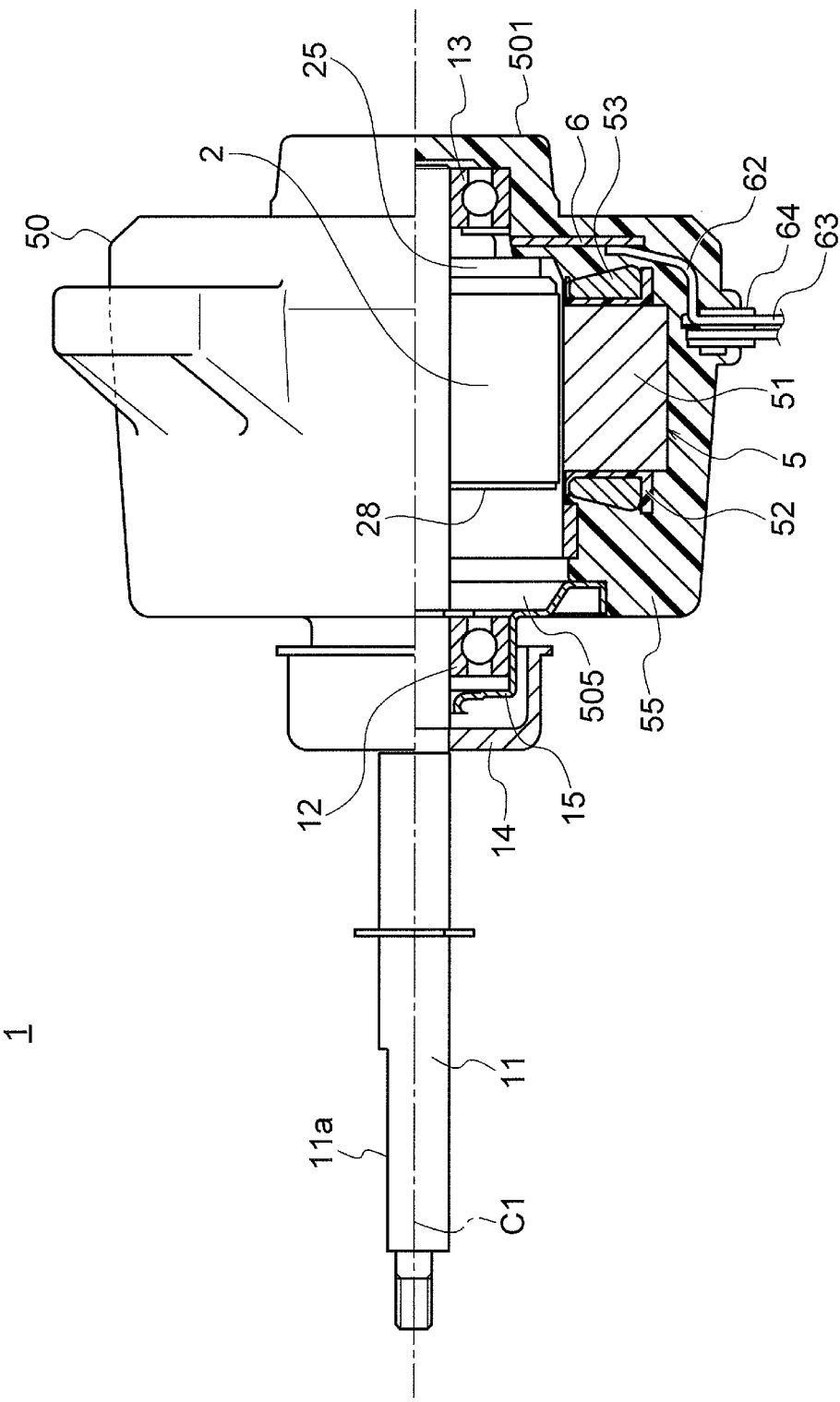
FIG. 1 is a partial sectional view illustrating a motor in a first embodiment.

FIG. 1 is a sectional view illustrating a configuration of a motor 1 according to a first embodiment of the present invention. The motor 1 is a brushless DC motor driven by an inverter. The motor 1 includes a rotor 2 including a shaft 11, a mold stator 50 provided so as to surround the rotor 2, and a conductive bracket 15 attached to the mold stator 50. The mold stator 50 includes a stator 5 and a mold resin part 55 covering the stator 5. The shaft 11 is a rotation shaft of the rotor 2.

In the following description, a direction of a center axis C1 of the shaft 11 will be referred to simply as an "axial direction." A circumferential direction about the center axis C1 of the shaft 11 will be referred to simply as a "circumferential direction". A radial direction of the stator 5 or the rotor 2 with respect to the center axis C1 of the shaft 11 will be referred to simply as a "radial direction."

The shaft 11 projects to the left in FIG. 1 from the mold stator 50, and an impeller of an air supply fan, for example, is attached to an attachment part 11a formed on a projecting part of the shaft 11. Thus, a projecting side (left side in FIG. 1) of the shaft 11 will be referred to as a "load side", and its opposite side (right side in FIG. 1) will be referred to as a "counter-load side."

Configuration of Mold Stator 50

As described above, the mold stator 50 includes the stator 5 and the mold resin part 55. The stator 5 includes a stator core 51, an insulation part (insulator) 52 attached to the stator core 51, and a coil (winding) 53 wound around the stator core 51 via the insulation part 52.

The mold resin part 55 includes a bearing support part 501 at one side (right side in FIG. 1) in the axial direction, and an opening part 505 at the other side (left side in FIG. 1) in the axial direction. The rotor 2 is inserted into a hollow part 56 of the mold stator 50 (FIG. 2) through the opening part 505.

Figure 2:
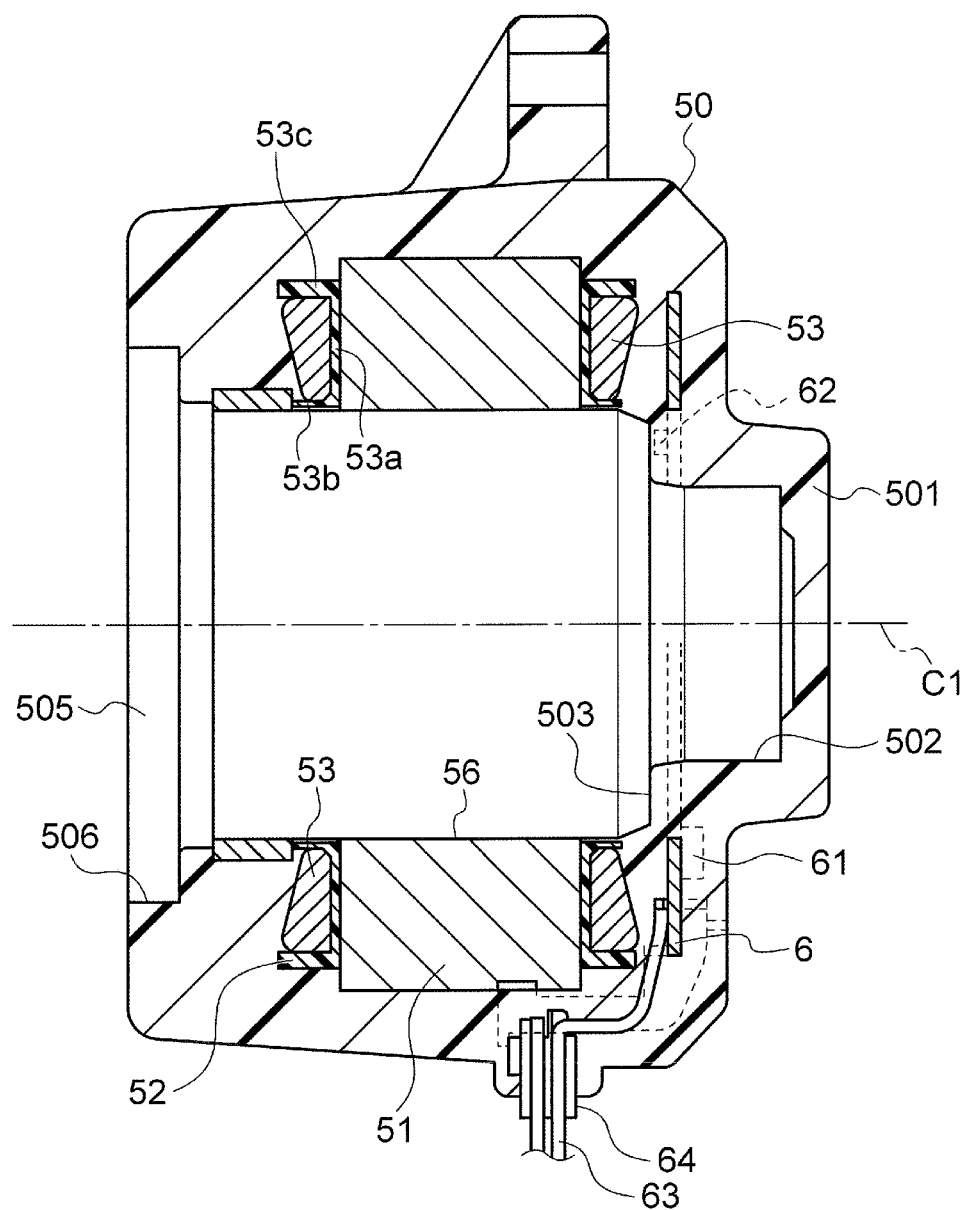
FIG. 2 is a sectional view illustrating a mold stator in the first embodiment.

The metal bracket 15 is attached to the opening part 505 of the mold resin part 55. The bracket 15 holds a bearing 12 supporting the shaft 11. A cap 14 for preventing water or the like from entering the bearing 12 is attached to an outer side of the bearing 12. The bearing support part 501 has a cylindrical inner peripheral surface 502 (FIG. 2). The inner peripheral surface 502 holds the other bearing 13 supporting the shaft 11.

FIG. 2 is a sectional view illustrating a configuration the mold stator 50. The mold resin part 55 of the mold stator 50 is made of unsaturated polyester resin. In particular, lump clay-like thermosetting bulk molding compound (BMC) resin obtained by adding additives to unsaturated polyester resin is desirable.

Unsaturated polyester resin (especially BMC) has a linear expansion coefficient equal to that of iron forming the stator core 51, and has a thermal shrinkage that is 1/10 or less of that of thermoplastic resin. Thus, unsaturated polyester resin is most desirable in obtaining high dimensional accuracy. In particular, since the bearings 12 and 13 are held by the mold resin part 55, dimensional accuracy of the mold resin part 55 affects coaxiality between the stator 5 and the rotor 2. Unsaturated polyester resin has a small thermal shrinkage, and thus high dimensional accuracy can be still obtained after molding. In addition, even when the motor 1 reaches a high temperature, backlash of the bearings 12 and 13 due to thermal expansion difference can be suppressed, since the linear expansion coefficient of unsaturated polyester resin is equal to that of iron.

When the mold resin part 55 is made of unsaturated polyester resin, heat dissipation performance higher than that when an outer casing of a metal such as iron or aluminum is used can be obtained. This is because of the following reason. While the metal outer casing needs to be separated from the coil 53 and a board 6 for insulation, unsaturated polyester resin is insulating material and is thus able to cover the coil 53 and the board 6, and unsaturated polyester resin has high thermal conductivity.

In this regard, when the mold resin part 55 is made of thermoplastic resin such as polybutylene terephthalate (PBT) or polyphenylene sulfide (PPS), there is an advantage that resin remaining in a runner of the molding mold can be easily reused. However, it is most desirable that the mold resin part 55 is made of unsaturated polyester resin (especially BMC) for the above described reasons. Further, the mold resin part 55 made of unsaturated polyester resin provides an advantage of suppressing deformation of the stator 5 due to an exciting force of the motor 1 to thereby suppress vibration and noise.

FIG. 3(A) is a plan view illustrating a configuration of the stator core 51. FIG. 3(B) is an enlarged view illustrating a part of the stator core 51. The stator core 51 is formed by stacking a plurality of electromagnetic steel sheets in the axial direction. The stator core 51 includes a yoke 511 annularly extending in the circumferential direction about the center axis C1 and a plurality of teeth 512 extending inward (toward the center axis C1) in the radial direction from the yoke 511. A tooth end 513 at an inner side of each tooth 512 in the radial direction faces an outer peripheral surface of the rotor 2 (FIG. 1). The number of the teeth 512 is 12 in this example, but is not limited to 12.

The stator core 51 is divided into a plurality of (12 in this example) split cores 51A each including one tooth 512. As illustrated in FIG. 3(B) in an enlarged scale, the split cores 51A are divided by split surfaces 518 each of which is formed at an intermediate position between adjacent ones of the teeth 512 in the yoke 511. The split surface 518 extends from an inner peripheral surface toward an outer peripheral surface of the yoke 511, and a hole 517 is formed at a terminal end of the split surface 518. A part of the yoke 511 on an outer periphery side of the hole 517 is a plastically-deformable thin part 516.

Figure 4A:
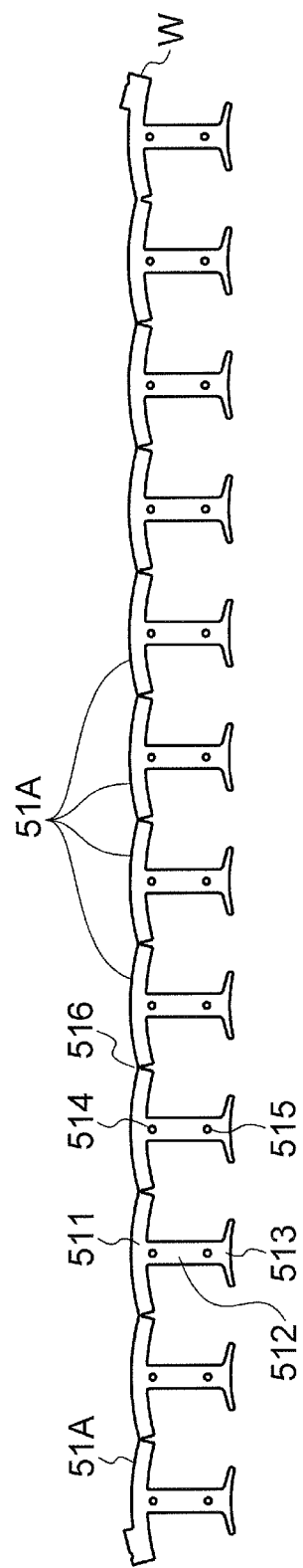
FIG. 4(A) is a view illustrating the stator core extended into a band shape.
Figure 4B:
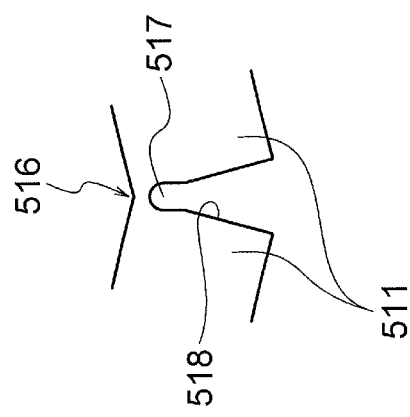
FIG. 4(B) is an enlarged view illustrating a part of the stator core.

FIG. 4(A) is a plan view illustrating the stator core 51 extended into a band shape. FIG. 4(B) is an enlarged view illustrating a part of the stator core 51 extended into the band shape. The stator core 51 can be extended into the band shape, as illustrated in FIG. 4(A). In this case, the thin part 516 between the adjacent split cores 51A is plastically deformable as illustrated in FIG. 4(B). That is, a plurality of split cores 51A constituting the stator core 51 are connected to one another at the thin parts 516.

This configuration enables the coil 53 to be wound around the teeth 512 in a state where the stator core 51 is extended into the band shape. After winding of the coil 53, the band-shaped stator core 51 is assembled into an annular shape, and both ends are welded (indicated by character W in FIG. 3(A)).

With reference to FIG. 2 again, the stator core 51 is covered with the mold resin part 55 as described above. Rigidity of the mold resin part 55 can be increased by increasing a thickness of the mold resin part 55 on an outer periphery side of the stator core 51 (i.e., a distance from an outer periphery of the stator core 51 to an outer periphery of the mold resin part 55).

In contrast, it is desirable that the thickness of the mold resin part 55 at an inner periphery side of the stator core 51 is as thin as possible. In the example illustrated in FIG. 2, an inner peripheral end surface of the stator core 51 is not covered with the mold resin part 55. In this case, it is desirable to form the mold resin part 55 as close to tip ends of the teeth 512 (FIG. 3(A)) as possible to suppress deformation of the teeth 512.

Since the stator core 51 is constituted by the above described split cores 51A, rigidity of the stator core is lower than that of a stator core not constituted by split cores. Thus, large merit is provided by covering the stator core 51 with the mold resin part 55 (unsaturated polyester resin). In particular, as the mold resin part 55 is provided between adjacent teeth 512 (FIG. 3(A)), deformation of the teeth 512 due to exciting force of the motor 1 can be suppressed.

The insulation part 52 formed on the stator core 51 is made of, for example, thermoplastic resin such as PBT. The insulation part 52 is formed by integral molding with the stator core 51 or by attaching a molded body of thermoplastic resin to the stator core 51. The coil 53 is wound around the teeth 512 of the stator core 51 via the insulation part 52. The insulation part 52 is attached to (or integrally molded with) the stator core 51, and the coil 53 is wound around the stator core 51, so that the above described stator 5 is obtained.

The board 6 is disposed on a side of the stator 5 in the axial direction, and more specifically, on the counter-load side (right side in FIG. 2) in this example. A driving circuit 61 that is an integrated circuit (IC) for driving the motor 1 and a magnetic sensor 62 are mounted on the board 6.

The magnetic sensor 62 is constituted by a Hall IC, and is disposed so as to face a sensor magnet 3 (FIG. 8) of the rotor 2. The magnetic sensor 62 detects a position (rotational position) of the rotor 2 in the circumferential direction based on a change of magnetic flux (N/S) from the sensor magnet 3, and outputs a detection signal.

A lead wire 63 is arranged on the board 6. The lead wire 63 includes a power supply lead wire for supplying electric power to the coil 53 of the stator 5 and a sensor lead wire for transferring a signal from the magnetic sensor 62 described later to outside. A lead wire lead-out part 64 for leading the lead wire 63 to outside is attached to an outer peripheral part of the mold resin part 55.

The detection signal from the magnetic sensor 62 is output to the driving circuit 61 or a driving circuit outside the motor 1 through the sensor lead wire. Based on the detection signal from the magnetic sensor 62, the driving circuit 61 (or the driving circuit outside the motor 1) controls current supplied to the coil 53 in accordance with a relative rotational position of the rotor 2 relative to the stator 5.

Figure 5:
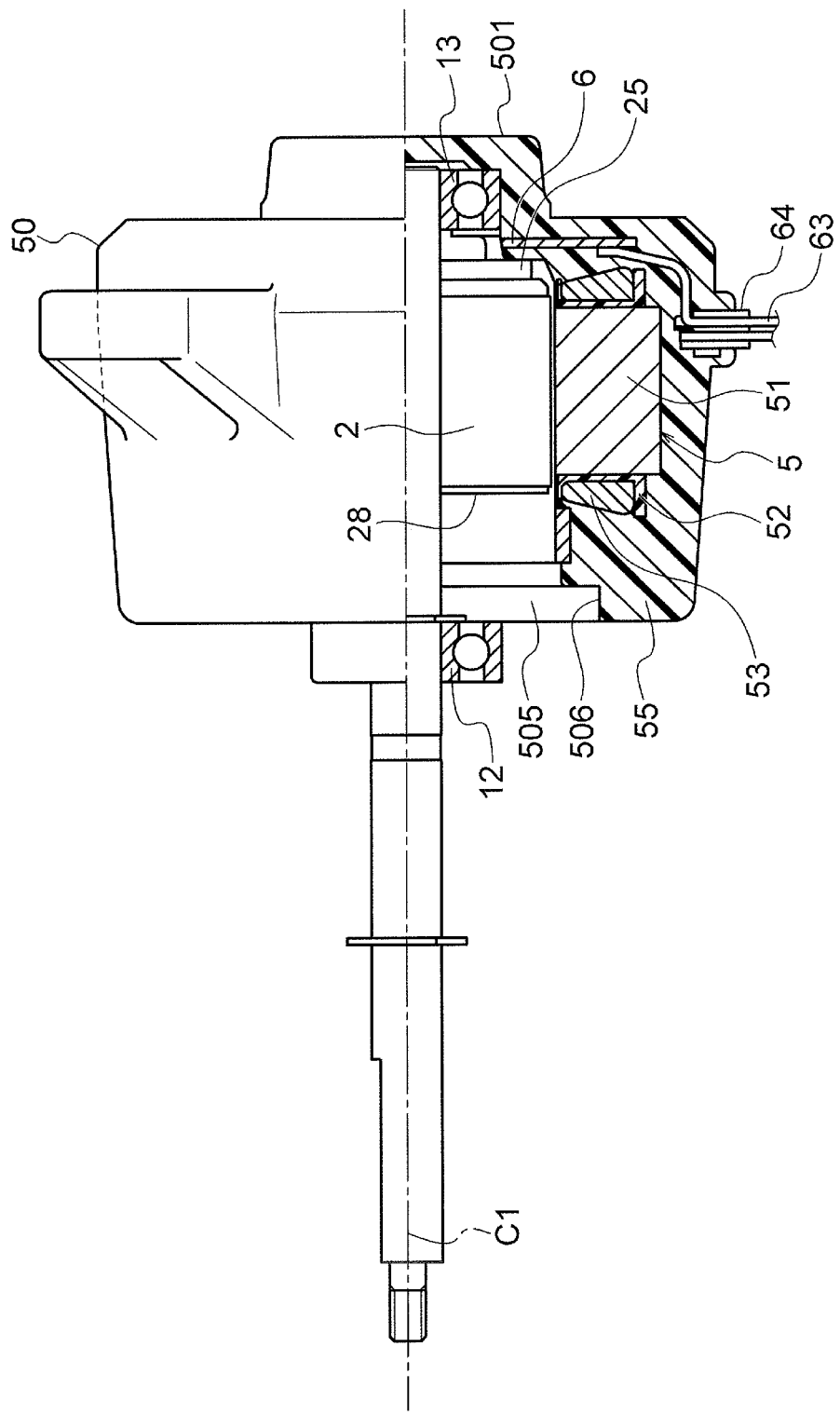
FIG. 5 is a partial sectional view illustrating a configuration of the motor in the first embodiment from which a bracket and a cap are detached.
Figure 6:
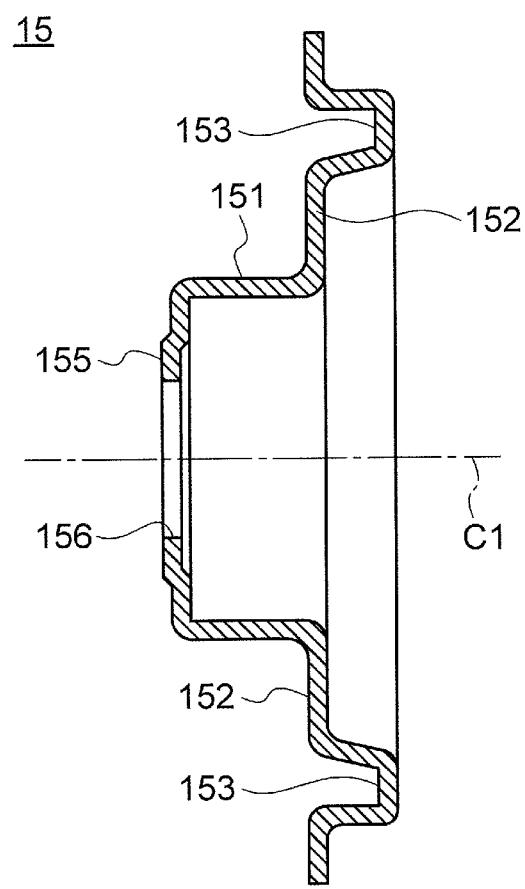
FIG. 6 is a sectional view illustrating the bracket of the motor in the first embodiment.

FIG. 5 is a view illustrating a configuration of the motor 1 from which the bracket 15 and the cap 14 are detached. FIG. 6 is a sectional view illustrating the bracket 15. The bracket 15 is press-fitted into an annular part 506 provided at an outer peripheral edge of the opening part 505 of the mold resin part 55. The bracket 15 is made of conductive metal such as galvanized steel sheet, but is not limited to this material.

As illustrated in FIG. 6, the bracket 15 includes a cylindrical part 151 which is cylindrical about the center axis C1, a disk part 152 formed on an outer side of the cylindrical part 151, and an annular press-fitted part 153 formed in the disk part 152 and having a rectangular cross section.

The press-fitted part 153 is a part that is press-fitted into the annular part 506 of the mold resin part 55. An outer diameter of the press-fitted part 153 is larger than an inner diameter of the annular part 506 by a press-fitting margin (amount of elastic deformation by press-fitting). A wall part 155 is formed so as to cover an end (left end in FIG. 6) of the cylindrical part 151. A hole 156 through which the shaft 11 passes is formed at a center of the wall part 155.

Configuration of Rotor 2

Figure 7:
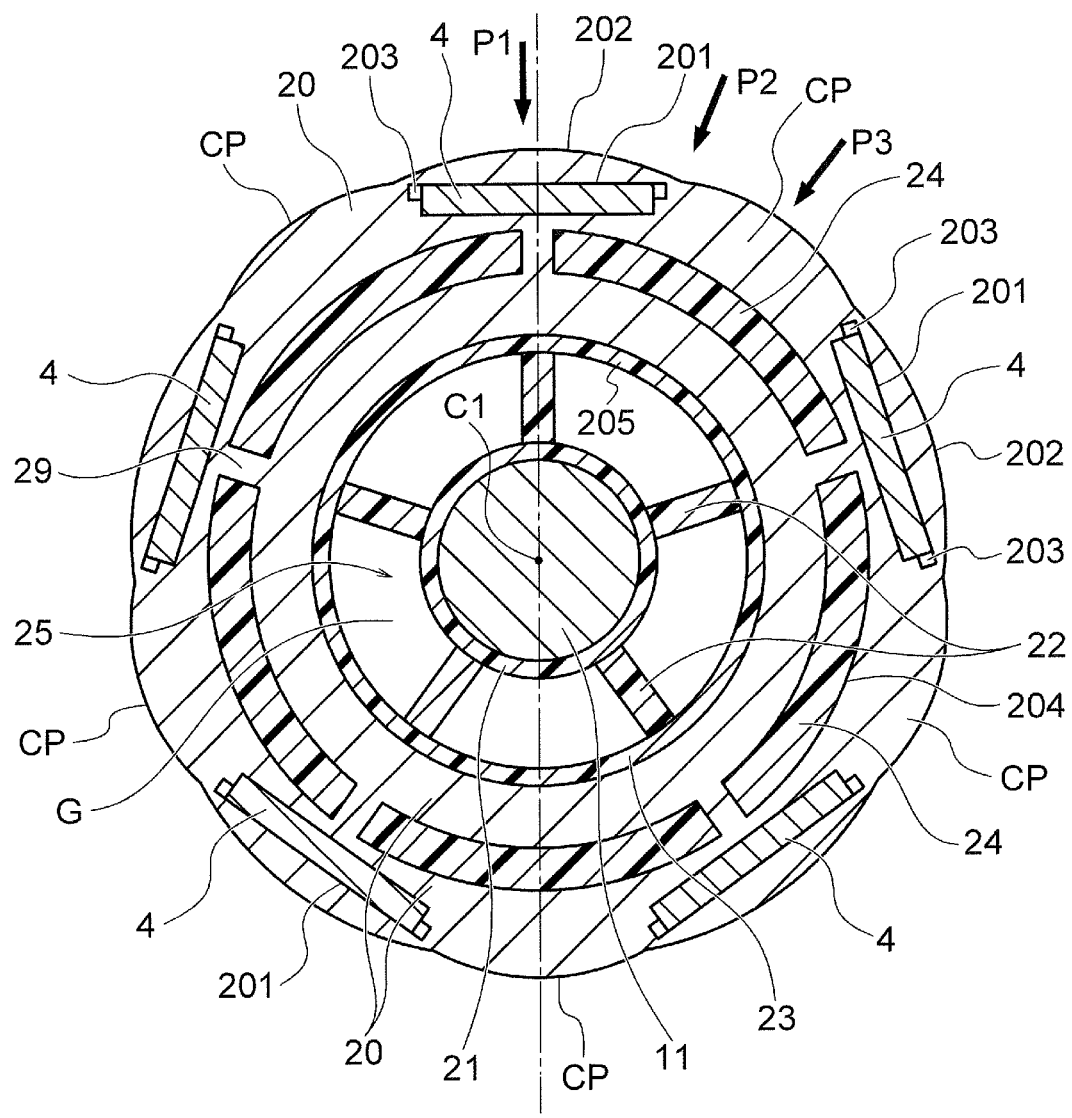
FIG. 7 is a sectional view illustrating a rotor in the first embodiment.

FIG. 7 is a sectional view illustrating a configuration of the rotor 2. The rotor 2 includes the shaft 11 as a rotation shaft, a rotor core 20 disposed on an outer side the shaft 11 in the radial direction, a plurality of (five in this example) main magnets 4 attached to the rotor core 20, and a resin part 25 supporting the rotor core 20 with respect to the shaft 11.

The rotor core 20 is an annular member which is annular about the center axis C1 and has a center hole 205 at an inner periphery side thereof. The rotor core 20 has a plurality of (five in this example) magnet insertion holes 201 arranged in the circumferential direction. The five magnet insertion holes 201 are arranged at equal intervals in the circumferential direction and located at the same distance from the center axis C1. Adjacent ones of the magnet insertion holes 201 are spaced apart from each other. The magnet insertion holes 201 pass through the rotor core 20 in the axial direction. The magnet insertion holes 201 are arranged in an outer peripheral part of the rotor core 20 and have widths in the circumferential direction.

The rotor core 20 is a stacked structure in which a plurality of stacking elements (more specifically, electromagnetic steel sheets) of soft magnetic material are stacked in the axial direction. Each of the electromagnetic steel sheets has a thickness of 0.1 mm to 0.7 mm.

The main magnet 4 as a rotor magnet is inserted in each of the five magnet insertion holes 201. The main magnet 4 has a flat plate shape whose cross section perpendicular to the axial direction is rectangular. Each main magnet 4 has a thickness of, for example, 2 mm.

The main magnet 4 is a rare earth magnet, more specifically, a neodymium sintered magnet containing neodymium (Nd), iron (Fe), and boron (B) as main components. Flux barrier parts 203 that are openings are formed at both ends of each magnet insertion hole 201 in the circumferential direction. The flux barrier parts 203 make a magnetic flux density distribution at the outer peripheral surface of the rotor 2 closer a sine wave, and suppress a short circuit of magnetic fluxes (i.e., leakage of magnetic fluxes) between adjacent ones of the main magnets 4.

The five main magnets 4 are disposed so that the same magnetic poles thereof (for example, north poles) are oriented to an outer periphery side of the rotor core 20. In a region CP between adjacent main magnets 4 in the rotor core 20, a magnetic pole opposite to that of the main magnets 4 (for example, a south pole) is formed.

That is, in the rotor 2, five first magnetic poles (for example, north poles) and five second magnetic poles (for example, south poles) are alternately arranged in the circumferential direction. Thus, the rotor 2 includes ten magnetic poles. Although the first magnetic poles are north poles and the second magnetic poles are south poles in this example, the first magnetic poles may be south poles and the second magnetic poles may be north poles. The ten magnetic poles of the rotor 2 are arranged at equiangular intervals in the circumferential direction with a pole pitch of 36 degrees (360 degrees/10).

This type of rotor 2 is called a consequent pole type. Specifically, in the ten magnetic poles of the rotor 2, a half (five) of the magnetic poles (first magnetic poles) are formed by the magnetic poles. The other five magnetic poles (second magnetic poles) are formed by the regions CP each between adjacent ones of the main magnets 4 in the rotor core 20.

In other words, in the rotor 2, the five magnet magnetic poles including the main magnets 4 and the five virtual magnetic poles (regions CP) including no main magnets 4 are alternately arranged in the circumferential direction. In the following description, the term "magnetic poles" includes both of the magnet magnetic pole and the virtual magnetic pole.

In the consequent pole type rotor 2, the number of magnetic poles is an even number of four or more. An outer periphery 202 of the rotor core 20 has a so-called flower circle shape. In other words, the outer periphery 202 of the rotor core 20 has the largest outer diameter at pole centers P1 and P2 (centers of the magnetic poles in the circumferential direction) and the smallest outer diameter at an inter-pole part P3 (between adjacent magnetic poles), and has an arc shape from each of the pole centers P1 and P2 to the inter-pole part P3. In this example, the pole center P1 is a center of the first magnetic pole (main magnet 4), and the pole center P2 is a center of the second magnetic pole (region CP).

In the example illustrated in FIG. 7, an angle (angle with respect to the center axis C1) from the pole center P1 of the first magnetic pole to the inter-pole part P3 is equal to an angle from the pole center P2 of the second magnetic pole to the inter-pole part P3. The outer diameter of the rotor core 20 at the pole center P1 is equal to the outer diameter of the rotor core 20 at the pole center P2. A length of each magnet insertion hole 201 (including the flux barrier parts 203) in the circumferential direction is longer than the pole pitch.

In the rotor core 20, a plurality of (five in this example) holes 204 each having an arc shape about the center axis C1 are formed on an inner side of the magnet insertion holes 201 in the radial direction. Each of the holes 204 extends in an arc shape between the pole centers (center positions in the circumferential direction) of each two of the main magnets 4 adjacent to each other in the circumferential direction.

A part of the rotor core 20 on an outer side of the holes 204 in the radial direction and a part of the rotor core 20 on an inner side of the holes 204 in the radial direction are connected with each other by bridge parts 29 formed at positions corresponding to the pole centers of the main magnet 4.

The resin part 25 supports the rotor core 20 with respect to the shaft 11, and is made of thermoplastic resin (for example, PBT). The resin part 25 magnetically separates the shaft 11 and the rotor core 20 from each other to thereby suppress magnetic flux leakage, i.e., leakage of rotor magnetic fluxes into the shaft 11.

The consequent pole type rotor 2 has a characteristic in which magnetic fluxes passing through virtual magnetic poles (regions CP) easily flow into the shaft 11 because of the absence of actual magnets in the virtual magnetic poles. A configuration in which the resin part 25 separates the shaft 11 from the rotor core 20 is effective especially for suppressing magnetic flux leakage in the consequent pole type rotor 2.

The resin part 25 includes an inner cylindrical part 21 attached to an outer peripheral surface of the shaft 11, an annular outer cylindrical part 23 disposed on an outer side of the inner cylindrical part 21 in the radial direction, and a plurality of (five in this example) ribs 22 connecting the inner cylindrical part 21 and the outer cylindrical part 23 to each other.

The shaft 11 passes through the inner cylindrical part 21 of the resin part 25. The ribs 22 are arranged at equal intervals in the circumferential direction and radially extend outward in the radial direction from the inner cylindrical part 21. The ribs 22 are formed at positions corresponding to the pole centers of the main magnets 4. A hollow part G is formed between each adjacent ones of the ribs 22 in the circumferential direction. It is desirable that the hollow part G passes through the rotor core 20 in the axial direction.

Since the radial ribs 22 are disposed as described above and the hollow parts G are provided between the ribs 22, use amount of resin can be reduced. Further, a natural frequency of the rotor 2 can be adjusted by changing dimensions of the ribs 22, and thus torsional resonance between the motor 1 and an impeller attached to the motor 1 can be suppressed.

The resin part 25 also includes filling parts 24 disposed in the arc-shaped holes 204 of the rotor core 20. By forming the holes 204 in the rotor core 20, use amount of the electromagnetic steel sheets forming the rotor core 20 can be reduced. Further, suppression effect of leakage of magnetic fluxes from the second magnetic poles (regions CP) into the shaft 11 can be obtained.

Figure 8:
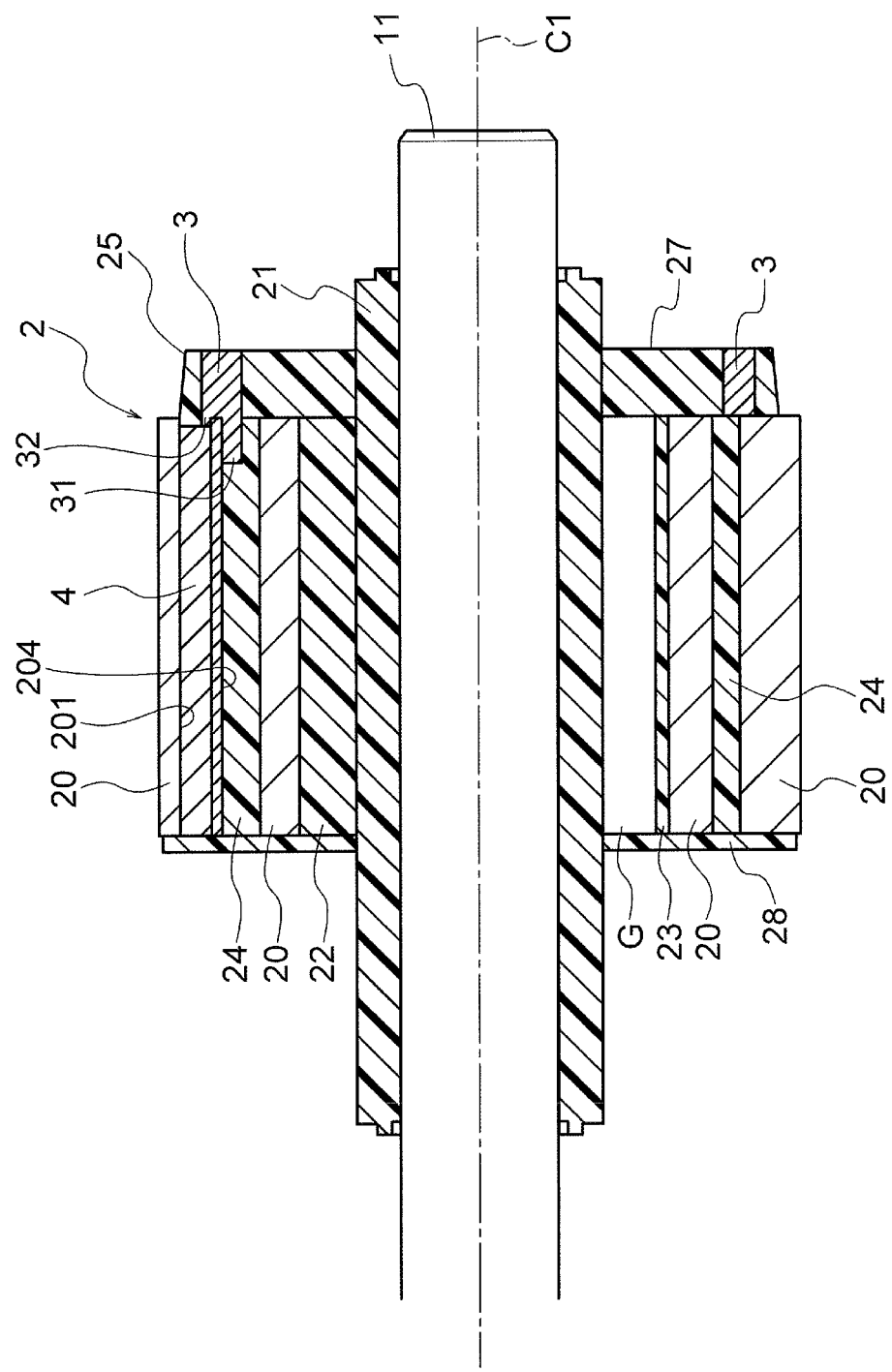
FIG. 8 is a sectional view illustrating the rotor in the first embodiment.

FIG. 8 is a sectional view illustrating the rotor 2 in a plane including the center axis C1. The resin part 25 includes an end surface covering part 27 covering one end surface (right end surface in FIG. 8) of the rotor core 20 in the axial direction and another end surface covering part 28 covering the other end surface of the rotor core 20 in the axial direction. The end surface covering parts 27 and 28 are formed continuously with the above described ribs 22, the outer cylindrical part 23, and the filling parts 24.

The end surface covering parts 27 and 28 of the resin part 25 also cover both end surfaces in the axial direction of each main magnet 4 attached to the rotor core 20. Thus, detachment of the main magnets 4 and displacement of the main magnets 4 in the axial direction can be prevented. Since the main magnets 4 are not exposed to outside, a change of the main magnets 4 with time can be suppressed. As compared to a case where end plates are attached to both ends of the rotor core 20 in the axial direction in order to prevent detachment of the main magnets 4, the number of parts and the number of process steps during manufacturing can be reduced, so that productivity can be enhanced and manufacturing cost can be reduced.

The annular sensor magnet 3 as a position detection magnet is attached to one side (right side in FIG. 8) of the rotor core 20 in the axial direction. The sensor magnet 3 is covered with the end surface covering part 27 of the above described resin part 25 from an inner side and an outer side in the radial direction. That is, the sensor magnet 3, the shaft 11 and the rotor core 20 are integrally molded with the resin part 25.

The sensor magnet 3 includes magnetic poles of the same number (ten in this example) as the main magnets 4. The sensor magnet 3 is attached to a side facing the board 6 illustrated in FIG. 2. A magnetic field of the sensor magnet 3 is detected by the magnetic sensor 62 (FIG. 2) of the board 6, and the position (rotational position) of the rotor 2 in the circumferential direction is thereby detected.

Figure 9:
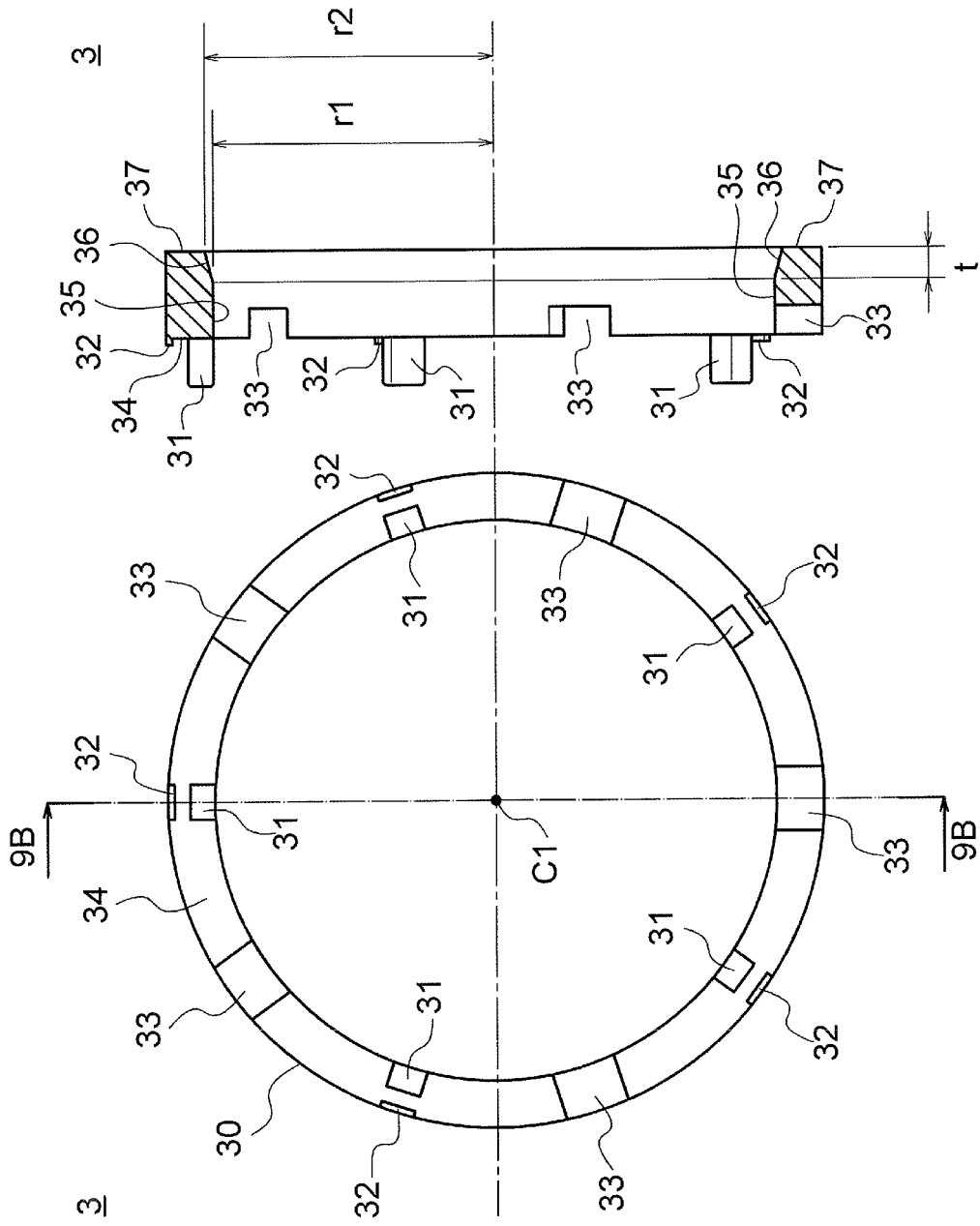
FIG. 9(A) and FIG. 9(B) are a front view and a sectional view illustrating a sensor magnet as a position detection sensor in the first embodiment.

FIG. 9(A) is a plan view illustrating the sensor magnet 3. FIG. 9(B) is a sectional view taken along line 9B-9B in FIG. 9(A) and as seen in a direction of arrows. As illustrated in FIG. 9(A), the sensor magnet 3 is an annular member which is annular about the center axis C1.

As illustrated in FIG. 9(B), the sensor magnet 3 includes a first end surface 34 facing the rotor core 20 (FIG. 8) and a second end surface 37 opposite to the first end surface 34. The first end surface 34 and the second end surface 37 are both end surfaces of the sensor magnet 3 in the axial direction.

An inner peripheral surface of the sensor magnet 3 includes a cylindrical surface 35 whose inner diameter is uniform in the axial direction and a tapered surface (tapered part) 36 whose inner diameter increases in the axial direction. The cylindrical surface 35 and the tapered surface 36 are arranged in this order from the first end surface 34 side. The inner radius of the cylindrical surface 35 is expressed as r1. The inner radius of the tapered surface 36 increases from r1 to r2 (>r1) from a terminal end of the cylindrical surface 35 to the second end surface 37. That is, the sensor magnet 3 includes the tapered surface 36 at its inner periphery, and the tapered surface 36 is inclined so that its inner radius is maximum (i.e., a distance from the center axis C1 is maximum) at the second end surface 37.

When the distance from a boundary between the cylindrical surface 35 and the tapered surface 36 to the second end surface 37 (i.e., a length of the tapered surface 36 in the axial direction) is expressed as t, t≥(r2−r1) is satisfied. In other words, an inclination angle of the tapered surface 36 with respect to the center axis C1 is 45 degrees or less.

The reason for employing a configuration in which the inner radii r1 and r2 of the sensor magnet 3 and the distance t satisfy t≥(r2−r1) is to bring the tapered surface 36 into contact with a contact surface in the molding mold 9 (FIG. 10) in integrally molding the shaft 11, the rotor core 20, and the sensor magnet 3 with the resin (resin part 25) so as to enhance coaxiality between the shaft 11 and the sensor magnet 3.

The tapered surface 36 has an annular shape in the circumferential direction about the center axis C1 in this example. However, the tapered surface 36 is not limited to this example. The tapered surface 36 may be dispersedly formed at a plurality of locations in the circumferential direction about the center axis C1.

Projections 31 (first projections) are formed on an inner periphery side of the first end surface 34 of the sensor magnet 3, and the projections 31 project in the axial direction. In this example, a plurality of projections 31 are arranged at equal intervals in the circumferential direction. The number (five in this example) of the projections 31 is equal to the number of the main magnets 4.

The projections 31 enter inside the holes 204 (FIG. 8) of the rotor core 20, and contact inner surfaces of the holes 204 from the inner peripheral side. Since the projections 31 contact (i.e., are engaged with) the inner surfaces of the holes 204, coaxiality between the sensor magnet 3 and the rotor core 20 can be enhanced. In other words, coaxiality between the shaft 11 and the rotor core 20 can be enhanced via the sensor magnet 3.

As illustrated in FIG. 8, the projections 31 are surrounded by the filling parts 24 in the holes 204 of the rotor core 20. Thus, a function to stop rotation of the sensor magnet 3 with respect to the rotor core 20 (rotation stop function) can be obtained. In this regard, if the number of the projections 31 is increased and the projections 31 contact both ends of each hole 204 in the circumferential direction, the rotation stop function can be achieved more effectively.

Projections 32 (second projections) are formed on an outer periphery side of the first end surface 34 of the sensor magnet 3, and the projections project in the axial direction. In this example, a plurality of projections 32 are arranged at equal intervals in the circumferential direction. A projection amount of each projection 32 in the axial direction is smaller than a projection amount of each projection 31 in the axial direction. The projections 32 enter inside the magnet insertion holes 201 (FIG. 8) of the rotor core 20 and contact end surfaces of the main magnets 4 in the axial direction.

The projections 32 contact the end surfaces of the main magnets 4 in the axial direction, and thus the main magnets 4 can be positioned in the axial direction. Accordingly, magnetic fluxes of the main magnets 4 can be utilized at maximum, so that performance of the motor 1 can be enhanced.

The number of the projections 32 and arrangement of the projections 32 in the circumferential direction are similar to those of the projections 31, but are not limited to this example. The projections 32 may be disposed at any positions as long as the projections 32 contact the end surfaces of the main magnets 4 in the axial direction.

As illustrated in FIG. 8, the projections 32 are surrounded by the end surface covering part 27 in the magnet insertion holes 201 of the rotor core 20. Thus, the function to stop rotation of the sensor magnet 3 with respect to the rotor core 20 (rotation stop function) can be obtained.

Recesses 33 extending in the radial direction are formed to connect an inner peripheral surface and an outer peripheral surface of the sensor magnet 3 to each other. The recesses 33 are grooves that are open at the first end surface 34. When the shaft 11, the rotor core 20, and the sensor magnet 3 are integrally molded with resin (resin part 25), the resin reaches an inner periphery side and an outer periphery side of the sensor magnet 3 through the recesses 33. Thus, the end surface covering part 27 (FIG. 8) covering the sensor magnet 3 from the inner periphery side and the outer periphery side can be formed with one molding process, and thus productivity can be enhanced.

Manufacturing Process of Rotor 2

Next, a manufacturing process of the rotor 2 will be described. The rotor 2 is manufactured by integrally molding the shaft 11, the rotor core 20, and the sensor magnet 3 with resin. The rotor core 20 is formed by stacking electromagnetic steel sheets and integrally fixing these electromagnetic steel sheets with crimping, and the main magnets 4 are inserted in the magnet insertion holes 201.

Figure 10:
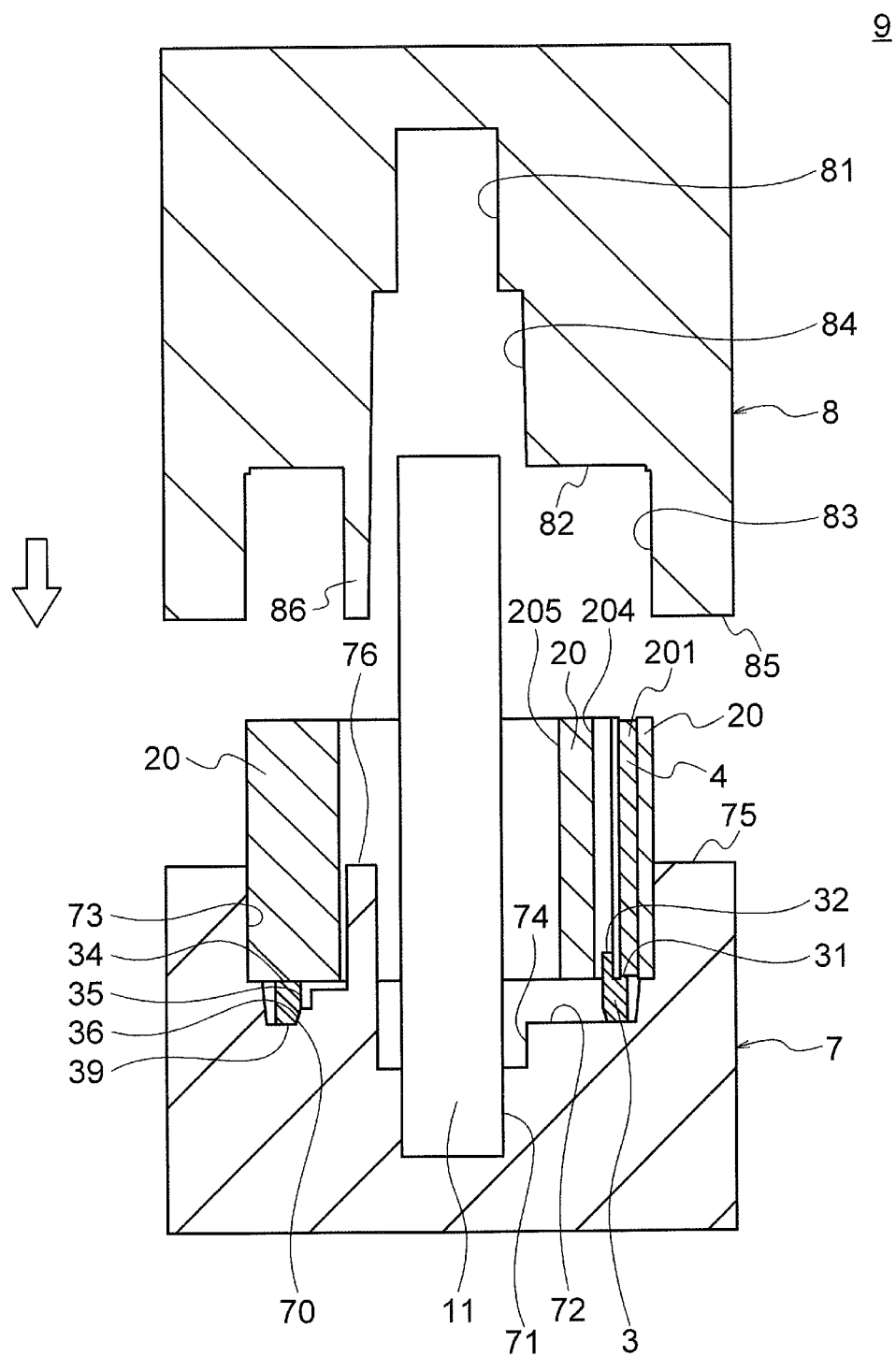
FIG. 10 is a schematic view for describing a molding mold for use in a manufacturing process of the rotor in first embodiment.

FIG. 10 is a sectional view illustrating a molding mold 9 for integrally molding the rotor core 20, the shaft 11, and the sensor magnet 3 with resin. The molding mold 9 includes a fixed mold (lower mold) 7 and a movable mold (upper mold) 8. The fixed mold 7 and the movable mold 8 respectively include mold mating surfaces 75 and 85 facing each other.

The fixed mold 7 includes a shaft insertion hole 71 in which an end (lower end in this example) of the shaft 11 is inserted, contact surfaces 70 that contact the tapered surface 36 of the sensor magnet 3, a rotor core insertion part 73 in which the rotor core 20 is inserted, a placement surface 72 that faces the second end surface 37 of the sensor magnet 3, a cylindrical part 74 that faces the outer peripheral surface of the shaft 11, and hollow forming parts 76 that are to be inserted in the center hole 205 of the rotor core 20.

Each contact surface 70 of the fixed mold 7 has an inclination corresponding to the tapered surface 36 of the sensor magnet 3. The contact surfaces 70 are formed at a plurality of locations in the circumferential direction about the center axis (corresponding to the center axis of the shaft 11) of the shaft insertion hole 71.

The movable mold 8 includes a shaft insertion hole 81 in which an end (upper end in this example) of the shaft 11 is inserted, a rotor core insertion part 83 in which the rotor core 20 is inserted, a placement surface 82 that faces an end surface of the rotor core 20 in the axial direction, a cylindrical part 84 that faces the circumference of the shaft 11, and a hollow forming parts 86 that are to be inserted in the center hole 205 of the rotor core 20.

In molding, the shaft 11 is inserted into the shaft insertion hole 71 of the fixed mold 7. In this way, the shaft 11 is positioned.

Further, the sensor magnet 3 is placed on the placement surface 72 of the fixed mold 7 in such a manner that the second end surface 37 faces downward. At this time, the tapered surface 36 of the sensor magnet 3 is in contact with the contact surfaces 70 of the fixed mold 7. Accordingly, the center axis of the shaft 11 and the center axis of the sensor magnet 3 are aligned with each other.

Then, the rotor core 20 is placed on the sensor magnet 3 placed on the placement surface 72 of the fixed mold 7. At this time, the projections 32 of the sensor magnet 3 are in contact with the end surfaces of the main magnets 4 in the magnet insertion holes 201 of the rotor core 20. Accordingly, the rotor core 20 and the main magnets 4 are positioned in the axial direction.

Further, the projections 31 of the sensor magnet 3 are engaged with the inner sides of the holes 204 of the rotor core 20. Thus, the center axis of the sensor magnet 3 is aligned with the center axis of the rotor core 20. That is, the center axes of the shaft 11, the sensor magnet 3, and the rotor core 20 are aligned with one another.

Thereafter, the movable mold 8 is moved downward as indicated by the arrow in FIG. 10 so that mold mating surfaces 75 and 85 are brought into contact with each other. In this state, the molding mold 9 is heated, and resin such as PBT is injected through a runner. The resin fills the holes 204 and the center hole 205 of the rotor core 20 inserted in the rotor core insertion parts 73 and 83. The resin also fills spaces inside the cylindrical parts 74 and 84, and further fills spaces between the rotor core 20 and the placement surfaces 72 and 82.

After the resin is injected into the molding mold 9 as described above, the molding mold 9 is cooled. Thus, the resin is cured, and the resin part 25 is formed. That is, the shaft 11, the rotor core 20, and the sensor magnet 3 are integrated by the resin part 25, so that the rotor 2 is formed.

Specifically, the resin cured between the shaft 11 and the cylindrical parts 74 and 84 of the molding mold 9 forms the inner cylindrical part 21 (FIG. 7). The resin cured inside the center hole 205 of the rotor core 20 (except where the hollow forming parts 76 and 86 are disposed) forms the ribs 22 and the outer cylindrical part 23 (FIG. 7). Regions corresponds to the hollow forming parts 76 and 86 of the molding mold 9 form the hollow parts G (FIG. 7).

The resin cured in the holes 204 of the rotor core 20 forms the filling part 24 (FIG. 7). The resin cured between the rotor core 20 and the placement surfaces 72 and 82 of the molding mold 9 forms the end surface covering parts 27 and 28 (FIG. 8).

Subsequently, the movable mold 8 is moved upward, and the rotor 2 is taken out of the fixed mold 7. Thus, manufacturing of the rotor 2 is completed.

In manufacturing the motor 1, the stator 5 is assembled by winding the coil 53 around the stator core 51 via the insulation part 52, and assembling the stator core 51 into the annular shape as illustrated in FIG. 3. Thereafter, the stator 5 is placed in a molding mold, and resin (for example, unsaturated polyester resin) is injected into the molding mold so that the mold resin part 55 is formed to cover the stator 5. Thus, the mold stator 50 is completed.

Subsequently, the bearings 12 and 13 are attached to the shaft 11 of the rotor 2, and are inserted into the hollow part 56 through the opening part 505 of the mold stator 50. Then, the bracket 15 is attached to the opening part 505 of the mold stator 50. Further, the cap 14 is attached to the outer side of the bracket 15. Thus, manufacturing of the motor 1 is completed.

In the above described manufacturing process, the tapered surface 36 of the sensor magnet 3 is in contact with the contact surfaces 70 of the molding mold 9, and thus coaxiality between the shaft 11 and the sensor magnet 3 can be enhanced. Further, the projections 32 of the sensor magnet 3 are in contact with the end surfaces of the main magnets 4, and thus the main magnets 4 can be positioned in the axial direction. Furthermore, the projections 31 of the sensor magnet 3 are engaged with the holes 204 of the rotor core 20, and thus coaxiality between the sensor magnet 3 and the rotor core 20 can be enhanced. Accordingly, coaxiality among the shaft 11, the rotor core 20, and the sensor magnet 3 are enhanced, and thus the high-performance motor 1 can be manufactured.

It is also conceivable to provide the projections 31 and 32 for positioning the rotor core 20 and the main magnets 4 on the molding mold 9 instead of the sensor magnet 3. In this case, however, hollow parts are formed in the resin part 25 corresponding to projections of the molding mold 9, and thus the main magnets 4 may be partially exposed, so that the main magnets 4 may degrade with time.

In contrast, in the first embodiment, since the projections 31 and 32 provided on the sensor magnet 3 are used for positioning the rotor core 20 and the main magnets 4, the main magnets 4 can be fully covered with the resin part 25. Thus, degradation of the main magnets 4 with time can be suppressed.

Although the contact surfaces 70 are provided in the fixed mold 7 in this example, the contact surfaces 70 may be provided in the movable mold 8. In such a case, the sensor magnet 3 may be disposed upon the rotor core 20 so that the tapered surface 36 of the sensor magnet 3 is brought into contact with the contact surfaces 70, and thus an advantage of enhancing coaxiality can be obtained.

In the example illustrated in FIG. 9(A), the sensor magnet 3 includes the cylindrical surface 35 and the tapered surface 36. However, the sensor magnet 3 may also be configured to include no cylindrical surface 35.

The stator core 51 is not limited to the split structure as illustrated in FIGS. 3 and 4, and a stator core of non-split structure may be used.

Advantages of the Embodiment

As described above, in the embodiment of the present invention, the rotor 2 includes the shaft 11, the rotor core 20, and the sensor magnet 3, the sensor magnet 3 includes the first end surface 34 facing the rotor core 20, and the second end surface 37 opposite to the first end surface 34, and the tapered surface 36 (tapered part) inclined so that the inner diameter (or the distance from the shaft 11) is maximum at the second end surface 37 is provided at the inner periphery of the sensor magnet 3. Thus, the tapered surface 36 of the sensor magnet 3 can be brought into contact with the contact surface 70 of the molding mold 9, and thus coaxiality between the shaft 11 and the sensor magnet 3 can be enhanced.

In addition, when the minimum inner radius of the tapered surface 36 is expressed as r1, the maximum inner radius of the tapered surface 36 is expressed as r2, and the length of the tapered surface 36 in the axial direction is expressed as 6, $t \geq (r2-r1)$ is satisfied. Thus, adjustment of coaxiality can be performed easily by bringing the tapered surface 36 into contact with the contact surface 70 of the molding mold 9.

Further, since the sensor magnet 3 includes the projections 31, and the projections 31 are engaged with the holes 204 of the rotor core 20, coaxiality between the sensor magnet 3 and the rotor core 20 can be enhanced by engagement between the projections 31 and the holes 204.

Further, since the sensor magnet 3 includes the projections 32 that enter the magnet insertion holes 201 of the rotor core 20, the main magnets 4 can be positioned in the axial direction by contact between the projections 32 and the main magnets 4.

Further, since the sensor magnet 3 includes the recesses 33 connecting the inner peripheral surface and the outer peripheral surface, resin reaches the inner periphery side and the outer periphery side of the sensor magnet 3 through the recesses 33 during molding. Thus, the resin part 25 (end surface covering part 27) covering the inner periphery side and the outer periphery side of the sensor magnet 3 can be formed with one molding process.

Further, since the rotor 2 is a consequent pole type rotor in which magnet magnetic poles are formed by the main magnets 4 and virtual magnetic poles are formed by the rotor core 20, the number of the main magnets 4 can be reduced to a half as compared to a motor having the same number of magnetic poles. Consequently, the number of expensive main magnets 4 can be reduced, and thus manufacturing cost of the motor 1 can be reduced.

Further, since the resin part 25 integrally holding the rotor core 20, the shaft 11, and the sensor magnet 3 is provided, the rotor core 20, the shaft 11, and the sensor magnet 3 can be held firmly.

Further, since the rotor core 20 and the shaft 11 are separated from each other by the resin part 25, leakage of magnetic fluxes into the shaft 11 that tends to occur in the consequent pole type rotor 2 can be suppressed. Consequently, performance of the motor 1 can be enhanced. In addition, use amount of electromagnetic steel sheets forming the rotor core 20 can be reduced, and manufacturing cost can be reduced.

Further, since the resin part 25 includes the ribs 22 radially extending from the circumference of the shaft 11, the hollow parts G can be formed between the ribs 22. Accordingly, use amount of resin forming the resin part 25 can be reduced, and manufacturing cost can be reduced. The natural frequency of the rotor 2 can be adjusted by changing the shapes (thicknesses, lengths, or the like) of the ribs 22, and thus torsional resonance between the motor 1 and an impeller attached to the motor 1 can be suppressed.

The end surfaces of the rotor core 20 in the axial direction are covered with the resin (end surface covering parts 27 and 28). Thus, the main magnets 4 are covered so as not to be exposed, and degradation of the main magnets 4 with time can be suppressed. Further, the resin also enters into the magnet insertion holes 201, and thus the main magnets 4 can be positioned inside the magnet insertion holes 201.

Variation

FIG. 11(A) is a plan view illustrating a sensor magnet 3A according to a variation of the first embodiment. FIG. 11(B) is a sectional view as seen in a direction of arrows along line 11B-11B in FIG. 11(A). The sensor magnet 3A according to this variation includes projections 31A extending in an arc shape about the center axis C1, instead of the projections 31 illustrated in FIG. 9(A).

The projections 31A extend along the inner periphery of the first end surface 34 of the sensor magnet 3A. The number of the projections 31A is equal to the number (five in this example) of the main magnets 4. Recesses 33 connecting the inner peripheral surface and the outer peripheral surface of the sensor magnet 3A are formed between the projections 31A adjacent to each other in the circumferential direction.

The arc-shaped projections 31A according to this variation are engaged, by fitting, with the arc-shaped holes 204 (FIG. 8) formed in the rotor core 20. Accordingly, coaxiality between the sensor magnet 3A and the rotor core 20 can be further enhanced. In addition, the function to stop rotation of the sensor magnet 3A with respect to the rotor core 20 (rotation stop function) can be enhanced.

The motor in this variation is configured in a manner similar to the motor 1 according to the first embodiment, except for the sensor magnet 3A.

In this variation, since the projections 31A extend in the arc shape, coaxiality between the sensor magnet 3A and the rotor core 20 can be further enhanced, and the rotation stop function of the sensor magnet 3A with respect to the rotor core 20 can be further enhanced.

Second Embodiment

Figure 12:
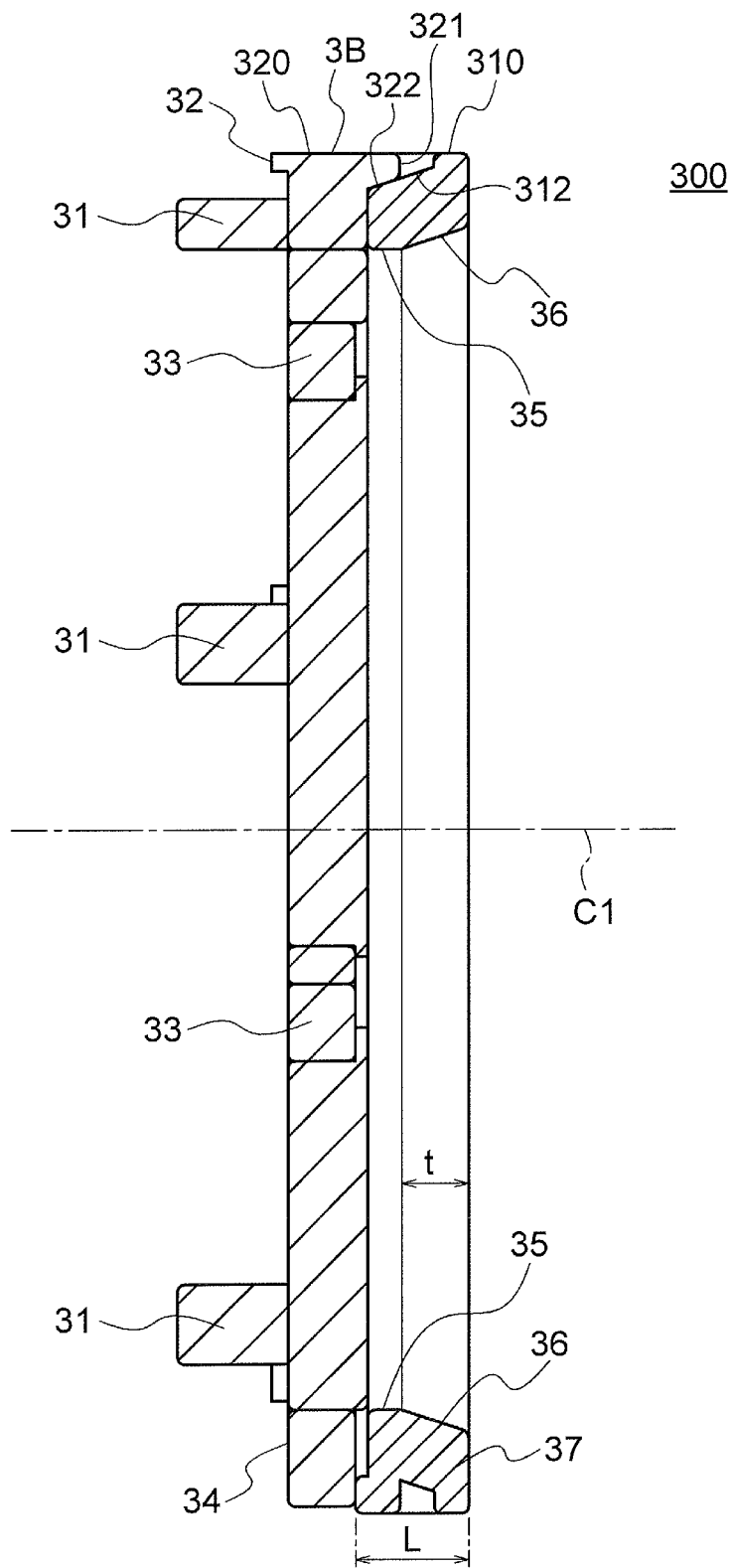
FIG. 12 is a sectional view illustrating a sensor magnet in a second embodiment.

FIG. 12 is a sectional view illustrating a sensor magnet 300 according to a second embodiment of the present invention taken along a plane including the center axis C1. As illustrated in FIG. 12, the sensor magnet 300 according to the second embodiment is divided, in the axial direction, into a spacer part (first part) 320 on the first end surface 34 side and a magnet part (second part) 310 on the second end surface 37 side.

The magnet part 310 is a part covering an area reaching a distance L from the second end surface 37 of the sensor magnet 300, and the distance L is longer than the above described distance t (length of the tapered surface 36 in the axial direction). The magnet part 310 includes the magnetic poles of the same number (ten in this example) as the number of the main magnets 4. A magnetic field of the magnet part 310 is detected by the magnetic sensor 62 (FIG. 2) of the board 6, and a position (rotational position) of the rotor 2 in the circumferential direction is thereby detected.

In contrast, the spacer part 320 is made of material which is less expensive than the magnet part 310, such as plastics. The spacer part 320 includes the projections 31, the projections 32, and the recesses 33 described in the first embodiment. The projections 31 may be replaced by the projections 31A illustrated in FIGS. 11(A) and 11(B).

Accordingly, the magnet part 310 generates magnetic fluxes necessary for detecting the rotational position of the rotor 2, and the spacer part 320 is made of inexpensive material, and thus manufacturing cost can be reduced without degradation of performance of the motor 1.

Here, positioning of the magnet part 310 and the spacer part 320 will be described. A tapered surface (second contact part) 312 whose outer diameter increases toward the second end surface 37 in the axial direction is formed at an outer peripheral part of the magnet part 310.

A projection part 321 projecting toward the magnet part 310 in the axial direction is formed at an outer peripheral part of the spacer part 320. A tapered surface (first contact part) 322 whose inner diameter increases toward an end in a projecting direction is formed on the projection part 321.

The tapered surface 312 of the magnet part 310 and the tapered surface 322 of the spacer part 320 contact each other, so that coaxiality between the magnet part 310 and the spacer part 320 can be enhanced. The tapered surfaces 312 and the tapered surfaces 322 are disposed at a plurality of locations in the circumferential direction about the center axis C1. In this example, the pairs of the tapered surfaces 312 and 322 are disposed at the same locations as the projections 31, for example, in the circumferential direction. The number of the pairs of the tapered surfaces 312 and 322 may be any number with which coaxiality between the magnet part 310 and the spacer part 320 can be enhanced.

Accordingly, since the magnet part 310 and the spacer part 320 are positioned by contact between the tapered surfaces 312 and 322, coaxiality between the shaft 11 and the sensor magnet 300 (the magnet part 310 and the spacer part 320) can be obtained to the same level as that obtained in the case of using the integrated sensor magnet 3 (FIGS. 9(A) and 9(B)).

When molding is performed with the molding mold 9, the projections 31 and 32 of the spacer part 320 are previously engaged with the rotor core 20. Then, the rotor core 20 provided with the spacer part 320 is disposed on the magnet part 310 previously placed in the molding mold 9 (FIG. 10). Since the tapered surfaces 322 of the spacer part 320 attached to the rotor core 20 contacts the tapered surfaces 312 of the magnet part 310, the center axes of the shaft 11, the sensor magnet 300, and the rotor core 20 can aligned with one another.

Alternatively, the magnet part 310 and the spacer part 320 may be previously fixed by crimping or with an adhesive agent in such a manner that the tapered surfaces 312 and 322 are in contact with each other. In a case where the magnet part 310 and the spacer part 320 fixed in this way (i.e., the sensor magnet 300) are placed in the molding mold 9 and then the rotor core 20 is placed on the sensor magnet 300 in a manner similar to the first embodiment, the projections 31 and 32 of the spacer part 320 are engaged with the rotor core 20, so that the center axes of the shaft 11, the sensor magnet 300, and the rotor core 20 can be aligned with one another.

As described above, in the second embodiment of the present invention, the sensor magnet 300 is divided into the magnet part 310 on the second end surface 37 side and the spacer part 320 on the first end surface 34 side. Thus, magnetic fluxes necessary for detecting the rotational position of the rotor 2 can be generated by the magnet part 310, and the spacer part 320 can be made of inexpensive material. Accordingly, manufacturing cost can be reduced without degradation of performance of the motor.

In addition, since the sensor magnet 300 and the spacer part 320 are positioned relative to each other at the tapered surfaces 312 and 322, coaxiality among the shaft 11, the sensor magnet 300, and the rotor core 20 can be enhanced.

Air Conditioning Apparatus

Figure 13:
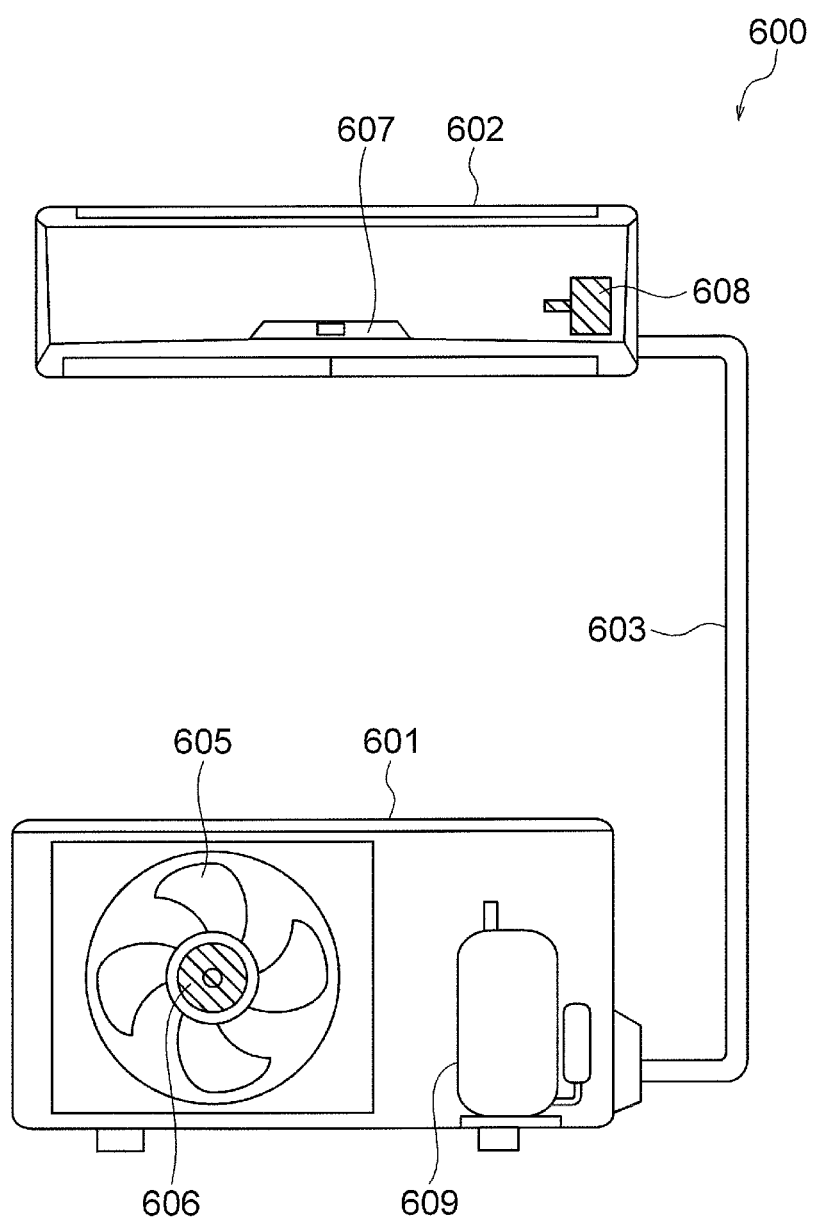
FIG. 13 is a view illustrating a configuration example of an air conditioning apparatus to which the motors according to the first and second embodiments are applicable.

Next, a configuration example of an air conditioning apparatus to which the motors 1 described in the embodiments and the variation are applicable will be described. FIG. 13 is a view illustrating a configuration of an air conditioning apparatus 600 to which the motor 1 is applicable.

The air conditioning apparatus 600 includes an outdoor unit 601, an indoor unit 602, and a refrigerant pipe 603 connecting these units. The outdoor unit 601 includes a first fan (air blower) 605 and a first motor 606 for rotating an impeller of the first fan 605. The indoor unit 602 includes a second fan 607 and a second motor 608 for rotating an impeller of the second fan 607. FIG. 13 also illustrates a compressor 609 for compressing refrigerant in the outdoor unit 601.

The motors 1 described in the embodiments and the variation are applicable to at least one of the first motor 606 and the second motor 608. As described above, each of the motors 1 described in the embodiments and the variation has high coaxiality among the shaft 11, the sensor magnet 3, and the rotor core 20 and exhibits high performance, and therefore performance of the air conditioning apparatus 600 can be enhanced. In addition, the motors 1 described in the embodiments and the variation are intended to reduce cost by employing the consequent pole type rotor 2. Thus, manufacturing cost of the air conditioning apparatus 600 can be reduced.

In this regard, the motors 1 described in the embodiments and the variation can be mounted on electrical equipment other than the air conditioning apparatus.

Although preferred embodiments of the present invention have been specifically described, the invention is not limited to the embodiments, and various improvement and modifications may be made within a range not departing from the gist of the invention.

What is claimed is:

1. A rotor comprising:
    a shaft;
    a rotor core formed of electromagnetic steel sheets and having an annular shape about the shaft; and
    a position detection magnet having an annular shape about the shaft and attached to one side of the rotor core in an axial direction of the shaft; and
    a resin part integrally holding the rotor core, the shaft, and the position detection magnet,
    wherein the position detection magnet has a first end surface facing the rotor core and a second end surface opposite to the first end surface,
    wherein the position detection magnet has a tapered part at an inner periphery thereof, the tapered part being inclined so that a distance from the shaft is maximum at the second end surface, and
    wherein the position detection magnet has a recess hole connecting an inner peripheral surface and an outer peripheral surface of the position detection magnet.

2. The rotor according to claim 1, wherein the position detection magnet has a part where a distance from the shaft is uniform in the axial direction, and the part is located at a side closer to the rotor core with respect to the tapered part.

3. The rotor according to claim 1, wherein the rotor satisfies:

$$t \geq (r2 - r1)$$

where r1 represents a minimum distance from a center axis of the shaft to the tapered part, r2 represents a maximum distance from the center axis of the shaft to the tapered part, and t represents a length of the tapered part in the axial direction.

4. The rotor according to claim 3, wherein the position detection magnet has a first projection projecting toward the rotor core, and
    wherein the rotor core has a hole with which the first projection is engaged.

5. The rotor according to claim 4, wherein the first projection extends in an arc shape about the shaft.

6. The rotor according to claim 1, further comprising a rotor magnet, wherein the rotor core has a magnet insertion hole in which the rotor magnet is attached.

7. The rotor according to claim 6, wherein the position detection magnet has a second projection that enters the magnet insertion hole of the rotor core.

8. The rotor according to claim 6, wherein the rotor is a consequent pole type rotor in which one magnetic pole is formed by the rotor magnet and the other magnetic pole is formed by the rotor core.

9. The rotor according to claim 1, wherein the rotor core and the shaft are separated from each other by the resin part.

10. The rotor according to claim 1, wherein the resin part has a plurality of ribs radially extending from a circumference of the shaft.

11. The rotor according to claim 1, wherein an end surface of the rotor core opposite to the position detection magnet is covered with resin.

12. A rotor comprising:
a shaft;
a rotor core formed of electromagnetic steel sheets and having an annular shape about the shaft; and
a position detection magnet having an annular shape about the shaft and attached to one side of the rotor core in an axial direction of the shaft; and
a resin part integrally holding the rotor core, the shaft, and the position detection magnet,
wherein the position detection magnet has a first end surface facing the rotor core and a second end surface opposite to the first end surface,
wherein the position detection magnet has a tapered part at an inner periphery thereof, the tapered part being inclined so that a distance from the shaft is maximum at the second end surface, and
wherein the position detection magnet is divided, in the axial direction, into a first part having the first end surface and a second part having the second end surface.

13. The rotor according to claim 12, wherein the first part has a first contact part at an outer periphery of the first part on a side facing the second part;
wherein the second part has a second contact part in contact with the first contact part; and
wherein each of the first contact part and the second contact part is inclined so that a distance from the shaft increases as a distance from the rotor core in the axial direction increases.

14. A motor comprising:
flail the rotor according to claim 1; and
a stator surrounding the rotor.

15. An air conditioning apparatus comprising:
an outdoor unit having a first fan and a first motor that drives the first fan;
an indoor unit having a second fan and a second motor that drives the second fan; and
a refrigerant pipe connecting the outdoor unit and the indoor unit to each other,
wherein at least one of the first motor and the second motor comprises:
the rotor according to claim 1; and
a stator surrounding the rotor.

16. A manufacturing method of a rotor, the method comprising the steps of:
preparing a shaft, an annular rotor core formed of electromagnetic steel sheets, and an annular position detection magnet;
placing the shaft, the rotor core, and the position detection magnet in a molding mold; and
injecting resin into the molding mold,
wherein the position detection magnet has a first end surface and a second end surface that are end surfaces in an axial direction, the position detection magnet having a tapered part at an inner periphery thereof, the tapered part being inclined so that a distance from the shaft is maximum at the second end surface,
wherein the molding mold has a shaft insertion part in which an end of the shaft is inserted and a contact surface to be in contact with the tapered part of the position detection magnet, and
wherein in the step of placing, the end of the shaft is inserted in the shaft insertion part of the molding mold, and the tapered part of the position detection magnet is brought into contact with the contact surface of the molding mold.

* * * * *